(No Model.)

H. S. ROSS.
PIPE COUPLING.

No. 405,745. Patented June 25, 1889.

WITNESSES:
C. W. Benjamin
Wallace Williams

INVENTOR
H. Schuyler Ross
BY
H. P. Preble Jr
his ATTORNEY

UNITED STATES PATENT OFFICE.

HENRY SCHUYLER ROSS, OF NEW YORK, N. Y.

PIPE-COUPLING.

SPECIFICATION forming part of Letters Patent No. 405,745, dated June 25, 1889.

Application filed October 9, 1888. Serial No. 287,638. (No model.)

*To all whom it may concern:*

Be it known that I, HENRY SCHUYLER ROSS, a citizen of the United States, and a resident of the city, county, and State of New York, have invented certain new and useful Improvements in Pipe-Couplings, of which the following is a specification.

The object of my invention is to provide a pipe-coupling which shall be perfectly tight and well adapted for all the purposes for which such couplings are used, and is more particularly intended for pipes made of lead or other malleable metal, or of substances upon which a thread cannot be cut to advantage.

In using malleable metal for the pipes which are to be coupled it is preferable to have the meeting ends hammered back to form a projecting flange, which shall be comparatively smooth and free from rough places or depressions, while in using substances which are not malleable a collar may be riveted on, or other device adopted for enlarging the meeting ends of the pipes.

My invention consists in a pipe-coupling composed of an outer sleeve reamed out to receive the enlarged ends of the pipes, internally threaded and provided with a shoulder for said enlarged ends to bear against; an inner sleeve externally threaded at a different pitch from said outer sleeve and provided with a flange at the end which comes against the pipe for the enlarged end of said pipe to bear against, and an intermediate sleeve or collar threaded both internally and externally with threads of different pitches to correspond to the threads on said outer and inner sleeves.

Figure 1:
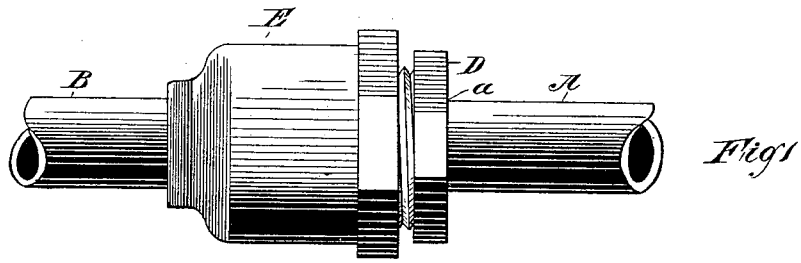
Figure 2:
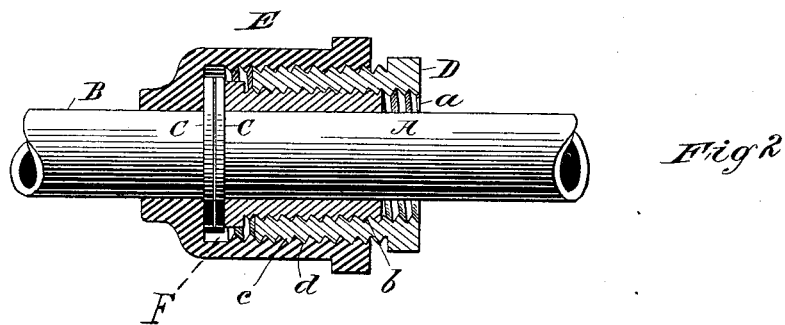
Figure 3:
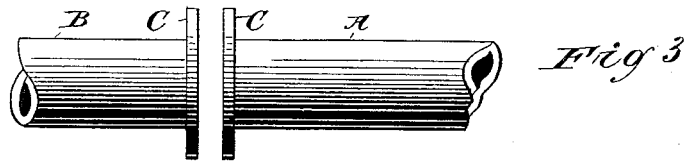

In the accompanying drawings, Figure 1 is an elevation. Fig. 2 shows the pipe in elevation and the coupling in section. Fig. 3 is a detail of the meeting ends of the pipes.

Same letters indicate similar parts in the different drawings.

A B represent the two pipes to be coupled. C represents the enlarged ends of said pipes, and, as stated before, may be formed of the pipe itself by swaging back the metal itself when malleable, or may be cast or made separate and fastened to the pipes by riveting, or in other convenient fashion. D is the intermediate sleeve or collar, E the outer sleeve or collar, and F the inner sleeve or collar. Sleeve F is externally threaded and sleeve D internally threaded at the same pitch $a$ $b$, so that they mesh with each other. Sleeve D is externally threaded and sleeve E internally threaded at the same pitch with each other, but at a different pitch from that of D and F, so that advantage is taken of the well-known power inherent in differential pulleys and differential screws in securing an unusual degree of pressure between the meeting ends of the pipes when brought together. $a$ is the thread of inner sleeve F, $b$ of sleeve D, internal, $c$ external, and $d$ the thread of outer sleeve E. Sleeves D and E are wholly or partially six-sided on their outer peripheries, so that they may be readily grasped by an ordinary monkey-wrench to screw them up toward each other and against the meeting ends of the pipes. Sleeve E is reamed out to form a shoulder $e$, against which the enlarged ends of the pipes press.

The operation of my improved coupling is as follows: The inner sleeve F and intermediate sleeve D are first screwed together by hand and slipped on one of the pieces of pipe to be joined, the end of which has been previously enlarged, as described, or, if desired, this enlargement may be made after the sleeves D and F have been put on. The sleeve E is then slipped on the other piece of pipe in similar fashion, and the parts of the coupling are then screwed together either by holding one part firm by a wrench and turning the other into it, or, what is quicker and better, turning both parts toward each other by wrenches at the same time, until the ends of the pipe are squeezed together with all the force which is desired for the coupling.

The uses and advantages of my improved coupling are, I think, sufficiently obvious to any one acquainted with the use of differential pulleys and screws without further explanation.

I claim—

A pipe-coupling which consists of an internally-threaded outer sleeve reamed out to receive the enlarged ends of the pipes and provided with a shoulder for said enlarged ends to bear against, an inner sleeve externally threaded at a different pitch from said outer sleeve, and an intermediate sleeve threaded internally and externally to fit the threads on said inner and outer sleeves, and projecting beyond the space between said sleeves and adapted to be held stationary while said sleeves are turned, substantially as and for the purpose described.

H. SCHUYLER ROSS.

Witnesses:
FREDK. H. DAVIS,
E. GATTERER.